March 5, 1963
J. A. DARDEN
3,079,883
WORK HOLDING CLAMP
Filed Aug. 8, 1960
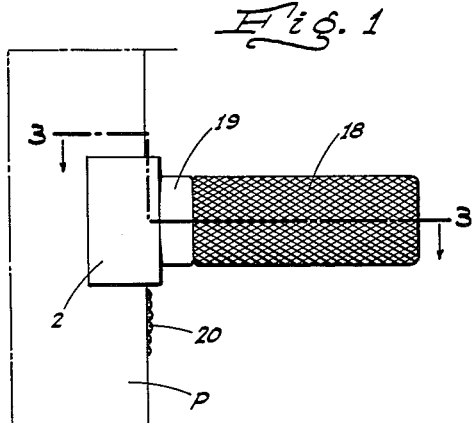
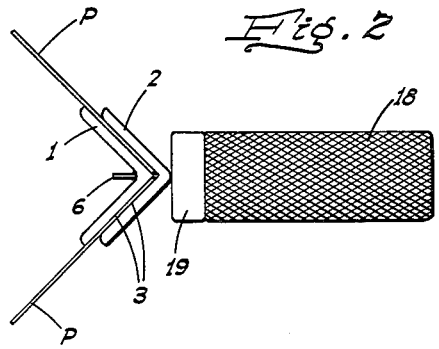
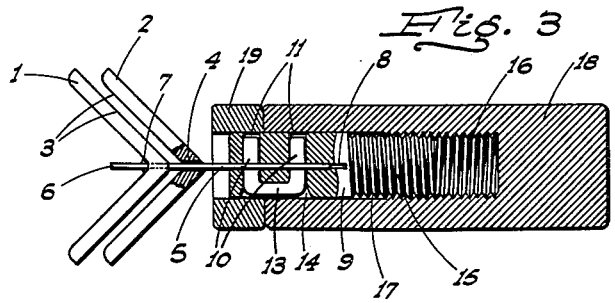
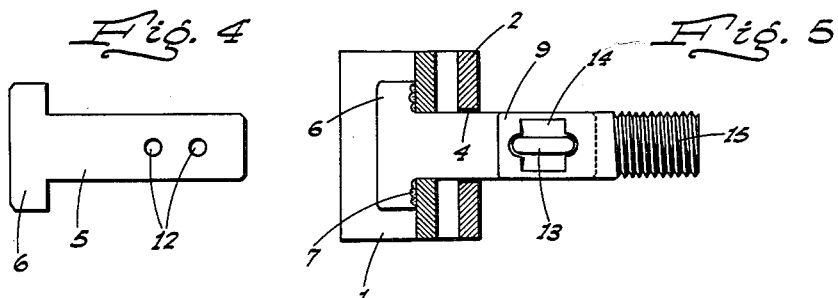
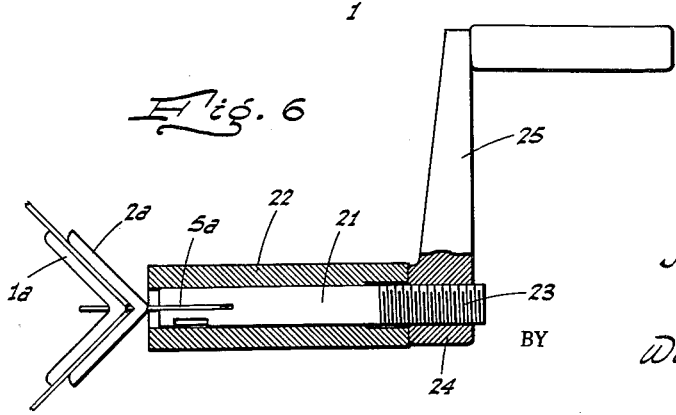
INVENTOR
John A. Darden
BY Webster & Webster
ATTORNEYS

# United States Patent Office 3,079,883
Patented Mar. 5, 1963

3,079,883
WORK HOLDING CLAMP
John A. Darden, Stockton, Calif.
(1833 Tennessee St., Vallejo, Calif.)
Filed Aug. 8, 1960, Ser. No. 48,183
1 Claim. (Cl. 113—99)

This invention relates to portable work holding clamps, and particularly to one designed to clamp separate metal plates in angular edge to edge relation to each other for welding of such plates together.

One object of this invention is to provide a clamp for the purpose which is so designed that such plates, when in a clamped position, will be disposed with their adjacent edges slightly separated, as is best for efficient welding operations.

A further object of the invention is to construct the clamp so that the jaws may be readily detached from each other, if necessary, as when welding operations have been effected on the plates above and below the jaws, and the clamp cannot be removed from the plates by a relative sliding movement.

Another object of the invention is to construct the clamp so that with the use of a single operating means, jaws of different sizes, or which include different angles, may be mounted in connection with such operating means.

It is also an object of the invention to provide a work holding clamp which is designed for ease and economy of manufacture.

An additional object of the invention is to provide a practical, reliable, and durable work holding clamp, and one which will be exceedingly effective for the purpose for which it is designed.

These objects are accomplished by means of such structure and relative arrangement of parts as will fully appear by a perusal of the following specification and claim.

In the drawings:

FIG. 1 is a side elevation of the clamp as engaging a pair of metal plates.

FIG. 2 is a top plan view of the clamp as in operation.

FIG. 3 is an enlarged plan view of the clamp, disengaged from the work, and mainly in section as on line 3—3 of FIG. 1.

FIG. 4 is a side elevation of the jaw supporting and work spacing strip of the clamp, detached.

FIG. 5 is a side elevation of such strip and the control shaft to which it is normally connected; the supported jaws being shown in section.

FIG. 6 is a plan view of a modified form of clamp.

Referring now more particularly to the drawings, and to the characters of reference marked thereon, and at present to the structure shown in FIGS. 1-5, the clamp comprises a pair of cooperating jaws 1 and 2, shaped so that the working faces 3 of the jaws, which are of course parallel to each other, are of right-angle form from side to side, with the apex of the angle centrally of the width of the jaws.

Secured in jaw 1 and projecting from the apex of the face thereof and through a slot 4 in jaw 2 at the apex of the working face thereof is an elongated thin but stiff strip 5; the width of such strip being disposed in a plane at right angles to the plane of the right-angle faces 3 of the jaws. As will be seen later, the strip 5 is a tension member, and in order to prevent said strip from pulling through jaw 1 it is formed with a cross head 6 which engages the back side of the jaw 1 and is secured thereto by suitable means such as welding, as indicated at 7.

The strip beyond the jaws extends into a diametral slot 8 formed in a shaft 9. The strip is releasably connected to the shaft by longitudinally spaced pins 10 removably projecting through diametral holes 11 in the shaft which intersect the slot 8 and also passing through matching holes 12 in the strip 5. The pins 10 are connected at one end in unitary staple-forming relation by a cross bar 13 countersunk in a recess 14 formed in one side of the shaft 9; the pins terminating short of the opposite side of the shaft, as shown in FIG. 3.

Beyond the slot 8 the shaft 9 is threaded, as at 15; the threaded portion being engaged in rotative and axially movable relation by the tapped portion 16 disposed at the bottom of a bore 17 which is formed in a shaft-embracing sleeve or handle member 18; said member being knurled for non-slip gripping, as indicated.

The end of the sleeve closest to the jaws terminates short of the adjacent end of the shaft 9, so that a collar 19, separate from the sleeve 18, may be supported on the shaft. The shaft in turn terminates some distance short of the jaw 2 when the latter is clamped to the work, so that said jaw is free to slide along strip 5, in a jaw opening direction, without being stopped by contact with the shaft 9.

In operation, the separate plates P which form the work are placed between the working faces 3 of the jaws while the latter are spread somewhat; the adjacent edges of the plates being abutted against the strip 5, which of course maintains such edges spaced apart the width of the strip, as is desired.

The jaws are then tightened against the work by clockwise rotation of the handle member 18, which advances said member on the shaft 9 due to the threaded connection therebetween. This forces the relatively non-rotating collar 19 against the jaw 2, sliding the latter forwardly against the work until the latter is clamped to the jaws. This movement of jaw 2 may actually of course be accompanied by a retractive movement of the jaw 1 as the shaft 9 is relatively retracted in the member 18 by such rotation of the latter.

When the plates P are thus firmly clamped in place, a weld may be applied to the edges of the plates, as indicated at 20. If such weld is applied only below the jaws, as shown for instance in FIG. 1, the clamp may then be withdrawn from the work by loosening the jaws and sliding the clamp upwardly to clear the plates.

If, however, the weld is applied both above and below the plates, the jaw 1 must be completely disengaged from the remaining portion of the clamp before the complete withdrawal of the clamp can be effected. To thus disengage the jaw 1 the member 18 is retracted on the shaft 9 sufficiently to completely expose the cross bar 13 of the strip-retaining staple. This enables the staple to be withdrawn from the shaft so that such shaft may be pulled off the strip 5, leaving the latter free to be slid back from between the plates, and at the same time of course disengaging the jaw 1 from the plates and from the remainder of the clamp.

For heavier duty work the clamp may be constructed as shown in FIG. 6. In this form of the clamp, the jaws 1a and 2a are the same as before, as is the strip 5a, and said strip is detachably connected to the stationary or non-rotative shaft 21 in the same manner as in the form of clamp shown in FIGS. 1-5.

This shaft 21 is elongated as compared with shaft 9, and projects rearwardly from the handle forming sleeve 22. This sleeve is freely slidable on the shaft 21, and at its forward end engages the adjacent jaw 2a. The rear portion of the shaft 21 is threaded, as indicated at 23, and engaged with such portion is the tapped hub 24 of a crank-handle 25.

It will therefore be seen that upon rotation of the crank handle in a direction to advance the hub 24 on the shaft 21, the sleeve 22 will be forced along the shaft against the jaw 2a, and the jaws will be relatively advanced toward each other and into clamping relation with the work.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A clamp comprising cooperating work-engaging jaws, a handle-forming sleeve projecting back from one jaw and having a bore, an elongated member rigid with the other jaw intermediate its ends and slidably projecting through said one jaw and into the bore, a shaft within the bore and having a longitudinal opening into which the member removably and non-turnably projects, means engaging the shaft to relatively move the shaft and sleeve lengthwise of each other, and a cross pin detachably connecting the shaft and member and embedded in the shaft adjacent the end thereof closest to the jaw and normally enclosed by the sleeve but exposed upon movement of the sleeve along the shaft a predetermined distance away from the one jaw.

References Cited in the file of this patent

UNITED STATES PATENTS

| | | |
|---|---|---|
| 311,487 | Hall | Feb. 3, 1885 |
| 330,538 | Woolsey | Nov. 17, 1885 |
| 1,047,519 | Haskell | Dec. 17, 1912 |
| 1,780,366 | Showers | Nov. 4, 1930 |
| 1,900,314 | Strom | Mar. 7, 1933 |
| 2,266,507 | Neumann et al. | Dec. 16, 1941 |
| 2,498,725 | Thornburg | Feb. 28, 1950 |
| 2,547,376 | Crawford | Apr. 3, 1951 |
| 2,569,286 | Bunker | Sept. 25, 1951 |
| 2,669,957 | De Vogt | Feb. 23, 1954 |

FOREIGN PATENTS

| | | |
|---|---|---|
| 143,493 | Australia | Sept. 19, 1951 |
| 452,882 | Canada | Nov. 23, 1948 |